(12) United States Patent
Andrews

(10) Patent No.: US 7,660,782 B2
(45) Date of Patent: Feb. 9, 2010

(54) ARCHITECTURE FOR MASTER DATA MANAGEMENT IN AN ENTERPRISE

(75) Inventor: James J. Andrews, Bangalore (IN)

(73) Assignee: WIPRO Limited, Bangalore, Karnataka (IN)

( * ) Notice: Subject to any disclaimer, the term of this patent is extended or adjusted under 35 U.S.C. 154(b) by 362 days.

(21) Appl. No.: 11/867,686

(22) Filed: Oct. 5, 2007

(65) Prior Publication Data
US 2009/0094278 A1     Apr. 9, 2009

(51) Int. Cl.
*G06F 17/30* (2006.01)
(52) U.S. Cl. .......................................... 707/2; 707/100
(58) Field of Classification Search ................ 707/2, 707/100–102
See application file for complete search history.

(56) References Cited

U.S. PATENT DOCUMENTS 7,213,037 B2 *   5/2007   Rangadass  ............... 707/104.1
7,509,326 B2 *   3/2009   Krabel et al.  ............... 707/100

* cited by examiner

*Primary Examiner*—Cheryl Lewis
(74) *Attorney, Agent, or Firm*—Prakash Nama; Global IP Services, PLLC

(57) ABSTRACT

Master data management and information exchange (MIX) architecture includes a technology agnostic framework that unifies sharing and management of master data across repositories, data formats and applications in an enterprise. The MIX architecture comprises at least one master data store which stores and updates master data for said enterprise; a management parameter store which assists in providing technology agnostic architecture for an adaptive extensible framework for unified master data; and, a unified interface for enabling master data discovery, sharing and use across the enterprise, wherein the unified interface comprises management interface, inbound interface and outbound interface. The MIX architecture might additionally include a data integration component, data quality component, and an abstraction layer. The present architecture enables extended MDM enterprise deployment and can be implemented as a stand alone solution or as an MDM veneer over existing applications without affecting overall system behavior and is technology independent.

21 Claims, 3 Drawing Sheets

ARCHITECTURE FOR MASTER DATA MANAGEMENT IN AN ENTERPRISE

FIELD OF THE INVENTION

This invention generally relates to improvements in managing master data in an IT (Information Technology) system, and more particularly to architecture for sharing and managing master data, enterprise data, across IT systems in a unified and extensible approach.

BACKGROUND OF THE INVENTION

Master Data Management (herein MDM) in known forms quickly and reliably creates a unified view of enterprise data from multiple sources. As known in prior art, MDM can uniquely identify each instance of a business element (customer, product, account, etc.) and represent these instances using a standardized data model. Creating a master data environment enables organizations to provide a single source of truth around which enterprise systems can be synchronized. MDM in one form requires extracting key data from diverse operational environments to create a system of record files, establishing links to keep that system and operational system files synchronized, and providing fast access across all operational systems to the master data without degrading operational performance. Efforts are being made to provide a viable software solution in an enterprise-wide master data management system for harmonizing, storing and managing master data over time. Some proposed software approaches attempt to increase the consistency and accuracy of corporate performance reporting by enabling business people to collaboratively control and manage master data in a workflow-driven web-based environment. Different types of master data include product, customer, supplier, employee, chart of accounts, key performance indicator, brand, and more. When effectively implemented, MDM provides a consistent context against which business performance can be measured.

In spite of efforts to provide useful master data management software, master data in an enterprise is often duplicated and managed in multiple systems, making it difficult to create consolidated views of business performance across the enterprise. This is particularly common in enterprises which regularly undergo mergers and acquisitions; which introduce, retire, buy and sell product lines; that open and close locations; and that operate under different and changing regulatory environments across corporate divisions or geographic regions. This inconsistency makes it an arduous task to gain consolidated views of enterprise performance, or compare results across the organization.

Current solutions in master data management are based on architectures that are:

Optimized for a specific master data type (e.g. Customer/product) or specific master data use cases.
Single centralized repository.
Tightly coupled to specific technology.

The implementation of current solutions adversely impacts enterprise deployment of MDM at least for the following reasons:

Difficulties in sharing and use of master data across the broader enterprise.
A single centralized repository is impractical in enterprise deployments where there is a wide range of latency and availability requirements.
Solution architectures require adoption of a complete technology stack—often impractical or too expensive for extended enterprise deployment.

Master data is a critical component of any IT system. The IT landscape in any large or medium size organization usually has a number of disparate IT systems that need the same master data. Each IT system maintains a local store of master data that is required for its operation. This leads to redundant master data across IT systems that are typically out of synchronization with respect to each other. This results in suboptimal decisions and processes that use the available inaccurate master data.

There is therefore need for providing improved architecture for management of master data across repositories, data formats and applications in an enterprise.

DESCRIPTION OF THE INVENTION

The invention provides novel technology independent architecture, termed herein as Master data and Information eXchange (MIX) architecture which comprises an adaptive extensible framework for enterprise master data management which selectively includes several components as described hereinafter.

An example of the architecture described herein provides a technology agnostic framework that unifies the sharing and management of master data across repositories, data formats and applications in the enterprise.

In a broad form, the invention resides in a master data Management and Information eXchange (MIX) architecture including a technology independent framework that unifies sharing and management of master data across repositories, data formats and applications in an enterprise, the MIX architecture comprising: a master data store means which stores and updates master data for the enterprise; a management parameter store which assists in providing architecture for an adaptive extensible framework for unified master data; and, wherein the MIX architecture is configured for selectively connecting the master data store means and the management parameter store for providing a unified IT system across the enterprise. The terms 'master data store means' and 'master data store' herein are to be understood to include both a single master data store and a plurality of master data stores as may be necessary. Likewise, the term 'store' is to be understood to include a plurality of stores as necessary. The master data store is configured to interact with a data integration component unit and a data quality component unit. The data integration component unit and the data quality component unit are configured to function in a range of technologies in the enterprise. Further, the data integration component unit includes elements for data integration, data syndication and workflow execution, and the data quality component unit includes elements for data profiling, data cleansing and data de-duplication, wherein each of said elements may be veneered.

In another form, the invention resides in a master data management and information exchange architecture including a technology independent framework that unifies sharing and management of master data across repositories, data formats and applications in an enterprise, the architecture comprising: a master data store means which stores and updates master data for the enterprise; a management parameter store which assists in providing architecture for an adaptive extensible framework for unified master data; and, a unified interface for enabling master data discovery, sharing and use across the enterprise.

In a modified form as described herein, the invention resides in a master data management and information exchange (MIX) architecture which is technology independent and including a framework that unifies sharing and management of master data across repositories, data formats and applications in an enterprise, the MIX architecture comprising: a master data store means which stores and updates master data for the enterprise; a management parameter store which assists in providing technology agnostic architecture for an adaptive extensible framework for unified master data; and, a unified interface for enabling master data discovery, sharing and use across the enterprise, wherein the unified interface includes a management interface, inbound interface and outbound interface.

As described hereinafter in an example, the MIX architecture is an adaptive technology agnostic, extensible framework for enterprise master data management. One form of the present architecture explained hereinafter by way of example, comprises selectively the following components:

Master data store/s.
Management parameter store.
Data integration component.
Data quality component.
Abstraction layer.
Management interface.
Inbound interface.
Outbound interface.

As aforesaid, prior forms of MDM architecture resort to using redundant master data across IT systems that are typically out of synchronization with respect to each other, with consequent disadvantages. The present MIX-architecture based solutions are intended to overcome the prior-art shortcomings through a technology agnostic solution designed to enable discovery and management of master data in federated deployment.

BRIEF DESCRIPTION OF THE DRAWING

A more detailed understanding of the invention may be had from the following description of embodiments, given by way of example and to be understood in conjunction with the accompanying drawing wherein.

DETAILED DESCRIPTION

A detailed description of one or more embodiments of the invention is provided below in the context of the accompanying figures that illustrate by way of example the principles of the invention. While the invention is described in connection with such embodiments, it should be understood that the invention is not limited to any embodiment. On the contrary, the scope of the invention is limited only by the appended claims and the invention encompasses numerous alternatives, modifications and equivalents. For the purpose of example, numerous specific details are set forth in the following description in order to provide a thorough understanding of the present invention.

The present invention may be practiced according to the claims without some or all of these specific details. For the purpose of clarity, technical material that is known in the technical fields related to the invention has not been described in detail so that the present invention is not unnecessarily obscured.

In one embodiment as aforesaid, the MIX architecture selectively includes a master data store, management parameter store, data integration component, data quality component, abstraction layer, management interface, inbound interface, and outbound interface. The following attributes apply to an embodiment described as an example:

MIX is a Reference Architecture for MDM. MIX specifies an architectural pattern for designing an MDM solution.

MIX is a product and technology neutral specification. A MIX-based solution may incorporate multiple products and technologies.

MIX is intended to integrate diverse technologies and products in a loosely coupled architecture for MDM, in contrast to other approaches to MDM that provide a single product based solution without an overarching blueprint to support other products or technologies.

Figure 1:
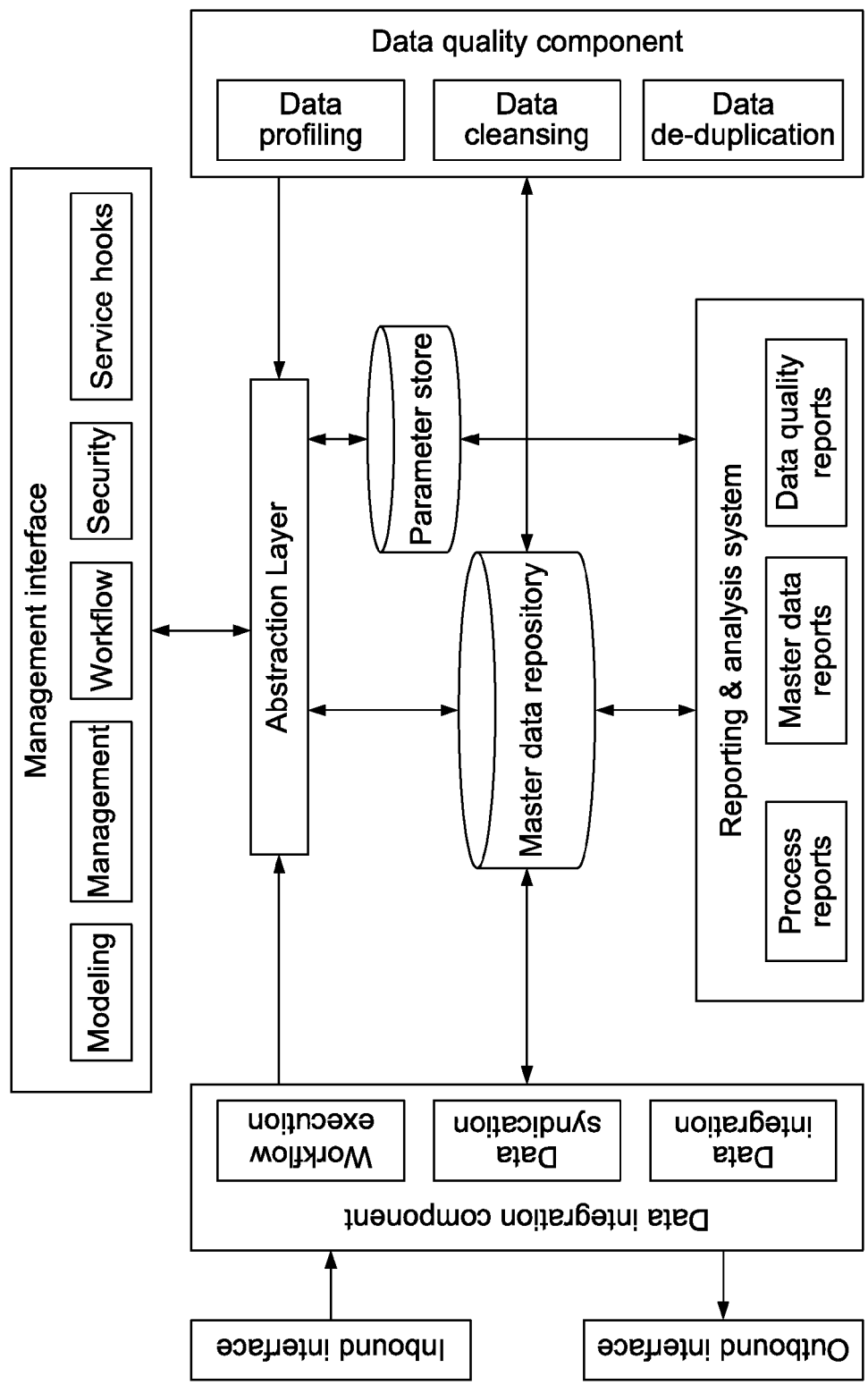
FIG. 1 illustrates an exemplary MIX architecture in a single repository stand alone configuration.

FIG. 1 generally illustrates a single repository configuration for an exemplary MIX architecture. The illustration in FIG. 1 shows a technology independent data modeling and data management system dealing with and including master data modeling, data management, workflow management, external service hooks and security, all of which are functionally linked with the master data repository. As shown, the master data repository interacts also with the reporting and analysis system which selectively provides MDM process reports, master data reports and data quality reports. The exemplary architecture shown in FIG. 1 illustrates a data integration component unit and a data quality component unit interacting with the master data repository. The data integration component unit and the data quality component unit are configured to function in a range of technologies in the enterprise. Further, the data integration component unit includes elements for data integration, data syndication and workflow execution, and the data quality component unit includes elements for data profiling, data cleansing and data de-duplication. As aforesaid, the present MIX architecture may include more than one repository with corresponding changes in the configuration as shown in the illustrations in FIG. 2 and FIG. 3.

Figure 2:
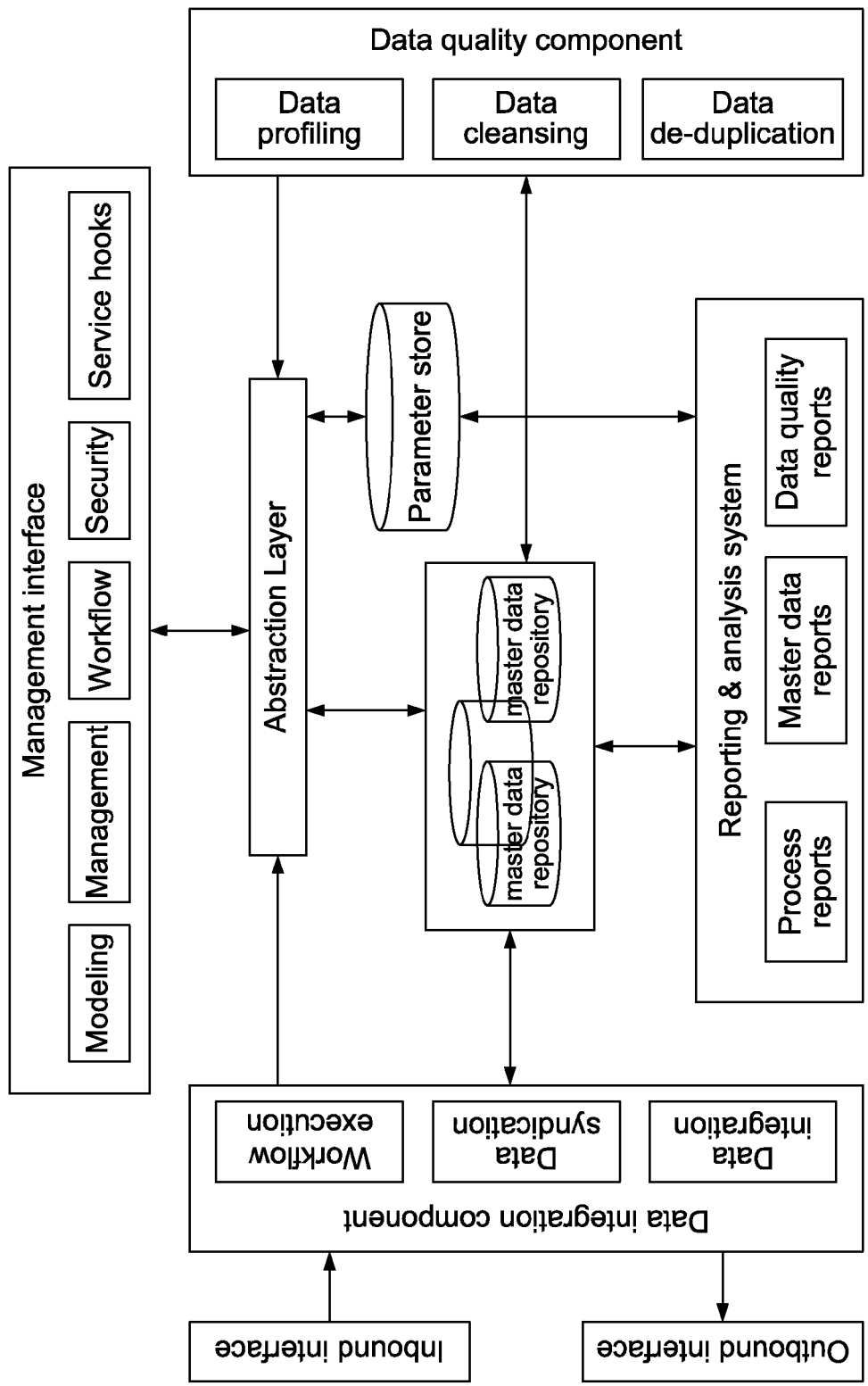
FIG. 2 illustrates an exemplary MIX architecture in a multi-repository stand alone configuration; and, FIG. 3 illustrates an exemplary MIX architecture in a multi-repository veneer type configuration.

FIG. 2 generally illustrates a multi-repository technology independent stand alone configuration of an exemplary MIX architecture. The illustration shows multiple, physically distributed master data repositories that are seamlessly integrated into a MIX architecture.

Figure 3:
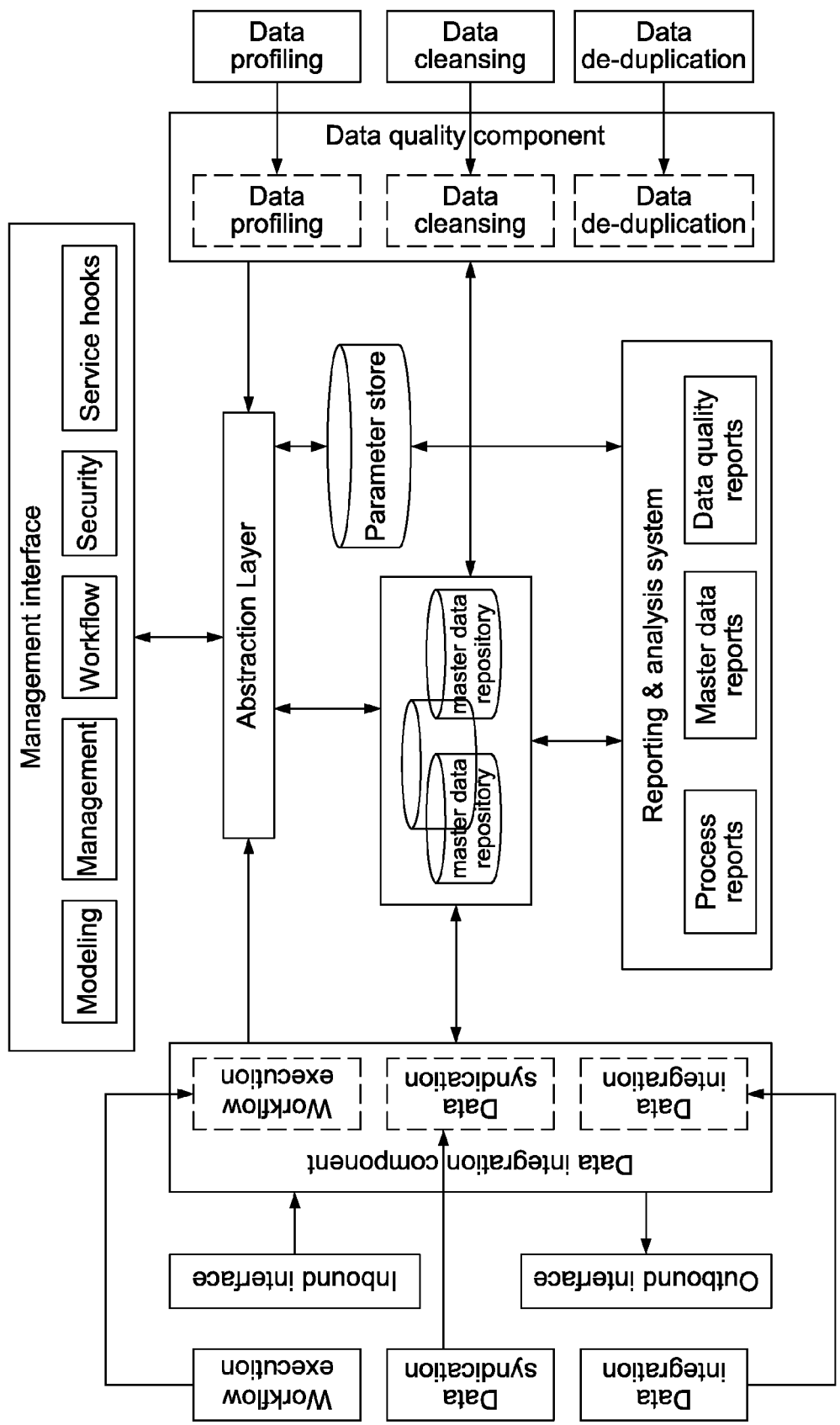

FIG. 3 generally illustrates a multi-repository veneer configuration of an exemplary MIX architecture. The illustration in FIG. 3, which is otherwise similar to FIG. 2, shows how external applications for data cleansing, data profiling and data de-duplication as well as data integration and workflow management (which are typically provided by different applications,) are seamlessly integrated into a unified master data management environment. To this end, the units for workflow execution, data syndication and data integration in FIG. 3 are shown in two layers and veneered. Likewise, the units of data profiling, data cleansing and data de-duplication in FIG. 3 are shown in two layers and veneered. It is conceivable that there could be more than two layers in the veneered structure.

A solution that fully implements the present MIX architecture will provide 'full lifecycle' MDM capabilities (Consolidate-Harmonize-Syndicate-Synchronize) for master data from multiple data sources. Current systems typically address only part of the MDM lifecycle or are limited to a single source for master data.

The MIX architecture provides a unifying framework for the various components of an MDM solution, typically delivered through a variety of technologies and products including typically a mixture of 'commercial off the shelf' (COTS) products and custom developed components.

The master data store, management parameter store, inbound interface and outbound interface comprise the MIX data repository. The master data store is a data model that can support master data of multiple data types in a flexible, extensible and technology independent manner. The management parameter store stores the control information that specifies the behavior of master data management processes and data representation.

Inbound and outbound interfaces are generally staging areas that are available for consolidation and syndication of master data (data import and data export).

The MIX data repository is configured to be technology independent, and for example can be implemented on a standard relational database.

The data integration component, for example can be a specialized engine for data extraction, transformation and load. This component is responsible for transporting MDM data.

The workflow component, for example provides data governance mechanisms and policies for master data, ensuring that changes to master data go through specified review and approval processes by named authorities.

The data quality component, for example provides de-duplication, standardization and data cleansing functionality for master data.

The management interface, for example can be a role-based user interface that provides appropriate functionality for data visualization and data management to users and application administrators.

The abstraction layer is an application programming interface (API) that enables client systems to access and manipulate master data in well-defined, technology-independent terms.

The advantages of the present MIX-architecture based solutions include the following:
Can be implemented as a standalone solution or as a 'MDM veneer' over existing applications,
Designed for enterprise master data discovery, sharing and use,
Individual solution components can be implemented in a range of technologies technology-agnostic) without adversely affecting overall system behavior, and
Provides a unified interface for enterprise master data management.

In the foregoing detailed description of embodiments of the invention, various features are grouped together in a single exemplary embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the detailed description of embodiments of the invention, with each claim standing on its own as a separate embodiment. It is understood that the above description is intended to be illustrative, and not restrictive. It is intended to cover all alternatives, modifications and equivalents as may be included within the spirit and scope of the invention as defined in the appended claims. Many other embodiments will be apparent to those of skill in the art upon reviewing the above description. The scope of the invention should therefore be determined with reference to the appended claims, along with the full scope of equivalents to which such claims are entitled. In the appended claims, the terms "including" and "in which" where present, are used as the plain-English equivalents of the respective terms "comprising" and "wherein," respectively. Moreover, the terms "first," "second," and "third," etc., where used are to be understood as merely as labels, and are not intended to impose numerical requirements on their objects.

The invention claimed is:

1. A master data Management and Information eXchange (MIX) architecture including a framework that unifies sharing and management of master data across repositories, data formats and applications in an enterprise, said MIX architecture comprising:
    at least one master data store which stores and updates master data for said enterprise;
    a management parameter store which assists in providing architecture for an adaptive extensible framework for unified master data; and,
    wherein said MIX architecture is technology independent and configured for selectively connecting said master data store and said management parameter store for providing a unified IT system across the enterprise.

2. The master data MIX architecture as in claim 1 wherein said at least one master data store is configured to store master data across repositories, data formats and applications in a technology agnostic manner.

3. The master data MIX architecture as in claim 1 including a connecting interface for selectively connecting said master data store and said management parameter store.

4. The master data MIX architecture as in claim 1 wherein said connecting interface includes inbound and outbound interfaces.

5. The master data MIX architecture as in claim 1 including an operator-accessible management interface.

6. The master data MIX architecture as in claim 1 including an abstraction layer.

7. The master data MIX architecture as in claim 6 including a data integration component unit.

8. The master data MIX architecture as in claim 7 including a data quality component unit.

9. The master data MIX architecture as in claim 8 wherein said data integration component unit and data quality component unit are configured to function in a range of technologies in the enterprise, further wherein, said data integration component unit includes elements for data integration, data syndication and workflow execution, and further said data quality component unit includes elements for data profiling, data cleansing and data de-duplication, wherein each of said elements may be veneered.

10. The master data MIX architecture as in claim 1 wherein the architecture is implementable as a veneer over existing applications.

11. A master data management and information exchange (MIX) architecture including a technology independent framework that unifies sharing and management of master data across repositories, data formats and applications in an enterprise, said MIX architecture comprising:
    at least one master data store which stores and updates master data for said enterprise;
    a management parameter store which assists in providing architecture for an adaptive extensible framework for unified master data; and,
    a unified interface for enabling master data discovery, sharing and use across the enterprise.

12. The master data MIX architecture as in claim 11 wherein said at least one master data store is configured to store master data across repositories, data formats and applications in a technology agnostic manner.

13. The master data MIX architecture as in claim 11 wherein said unified interface is configured for selectively connecting said master data store and said management parameter store.

14. The master data MIX architecture as in claim 11 wherein said connecting interface includes inbound and outbound interfaces.

15. The master data MIX architecture as in claim 11 including an operator-accessible management interface.

16. The master data MIX architecture as in claim 11 including an abstraction layer.

17. The master data MIX architecture as in claim 16 including a data integration component unit.

18. The master data MIX architecture as in claim 17 including a data quality component unit.

19. The master data MIX architecture as in claim 18 wherein said data integration component unit and data quality component unit are configured to function in a range of technologies in the enterprise, further wherein, said data integration component unit includes elements for data integration, data syndication and workflow execution, and further, said data quality component unit includes elements of data profiling, data cleansing and data de-duplication, wherein each of said elements may be veneered.

20. The master data MIX architecture as in claim 11 wherein the architecture is implementable as a veneer over existing applications.

21. A master data management and information exchange (MIX) architecture including a framework that unifies sharing and management of master data across repositories, data formats and applications in an enterprise, said MIX architecture being configured to be technology independent and comprising:
    at least one master data store which stores and updates master data for said enterprise;
    a management parameter store which assists in providing technology agnostic architecture for an adaptive extensible framework for unified master data; and,
    a unified interface for enabling master data discovery, sharing and use across the enterprise, wherein the unified interface comprises management interface, inbound interface and outbound interface.

* * * * *